US007044444B2

(12) United States Patent
Haubold et al.

(10) Patent No.: US 7,044,444 B2
(45) Date of Patent: May 16, 2006

(54) ACTUATOR ELEMENT WITH POSITION DETECTION

(75) Inventors: Thomas Haubold, Marbach (DE); Dirk Traichel, Beitigheim-Bissingen (DE)

(73) Assignee: Mann & Hummel GmbH, Ludwigsburg (DE)

(*) Notice: Subject to any disclaimer, the term of this patent is extended or adjusted under 35 U.S.C. 154(b) by 79 days.

(21) Appl. No.: 10/771,143

(22) Filed: Feb. 4, 2004

(65) Prior Publication Data

US 2004/0189284 A1 Sep. 30, 2004

(30) Foreign Application Priority Data

Feb. 4, 2003 (DE) ................................ 103 04 551

(51) Int. Cl.
*F16K 37/00* (2006.01)

(52) U.S. Cl. ....................... 251/279; 251/229; 137/554

(58) Field of Classification Search ................ 251/229, 251/279; 137/554
See application file for complete search history.

(56) References Cited

U.S. PATENT DOCUMENTS 4,012,843 A 3/1977 Harada et al.
4,111,524 A 9/1978 Tomlinson, III
4,153,330 A 5/1979 Tomlinson, III
4,198,117 A 4/1980 Kobayashi
4,219,933 A 9/1980 Kita et al.
4,246,338 A 1/1981 Kaplan
4,299,488 A 11/1981 Tomlinson, III
4,343,532 A 8/1982 Palmer
4,387,955 A 6/1983 Ludman et al.
4,652,080 A 3/1987 Carter et al.
4,741,588 A 5/1988 Nicia et al.
4,846,552 A 7/1989 Veldkamp et al.
4,857,726 A 8/1989 Kinney et al.
4,909,560 A * 3/1990 Ginn ........................ 296/65.15
4,926,412 A 5/1990 Jannson et al.
5,007,708 A 4/1991 Gaylord et al.
5,061,025 A 10/1991 Debesis
5,080,465 A 1/1992 Laude
5,085,496 A 2/1992 Yoshida et al.
5,216,680 A 6/1993 Magnusson et al.
5,233,405 A 8/1993 Wildnauer et al.
5,269,343 A * 12/1993 Trapp ......................... 137/554
5,278,687 A 1/1994 Jannson et al.
5,363,220 A 11/1994 Kuwayama et al.

(Continued)

FOREIGN PATENT DOCUMENTS

EP 0345459 B1 11/1992

(Continued)

OTHER PUBLICATIONS

Wade, U.S. Appl. No. 09/382,492, Aug. 25, 1999.

(Continued)

*Primary Examiner*—J. Casimer Jacyna
(74) *Attorney, Agent, or Firm*—Crowell & Moring LLP

(57) ABSTRACT

An actuator element suitable, for example, for actuating a rotatable disk or a flap valve shaft. The actuator includes a housing, a drive situated in the housing, and at least one position detector, in which a movably mounted piston rod in the housing is operatively connected to the drive for exerting a force effect, and in which the position detector includes at least one stationary Hall sensor and at least one magnet movable relative to the Hall sensor such that the magnet produces a magnetic field for generating a magnetic flux.

8 Claims, 2 Drawing Sheets

U.S. PATENT DOCUMENTS

| | | | |
|---|---|---|---|
| 5,420,719 A | 5/1995 | Montgomery et al. | |
| 5,422,745 A | 6/1995 | Williams et al. | |
| 5,450,510 A | 9/1995 | Boord et al. | |
| 5,450,512 A | 9/1995 | Asakura | |
| 5,457,573 A | 10/1995 | Iida et al. | |
| 5,526,155 A | 6/1996 | Knox et al. | |
| 5,555,334 A | 9/1996 | Ohnishi et al. | |
| 5,583,683 A | 12/1996 | Scobey | |
| 5,748,815 A | 5/1998 | Hamel et al. | |
| 5,777,763 A | 7/1998 | Tomlinson, III | |
| 5,793,912 A | 8/1998 | Boord et al. | |
| 5,796,479 A | 8/1998 | Derickson et al. | |
| 5,835,458 A | 11/1998 | Bischel et al. | |
| 5,907,436 A | 5/1999 | Perry et al. | |
| 5,912,997 A | 6/1999 | Bischel et al. | |
| 5,914,811 A | 6/1999 | Chen et al. | |
| 5,946,128 A | 8/1999 | Paek | |
| 5,970,190 A | 10/1999 | Fu et al. | |
| 6,002,522 A | 12/1999 | Todori et al. | |
| 6,577,786 B1 | 6/2003 | Cappiello et al. | |
| 6,633,157 B1 * | 10/2003 | Yamaki et al. | 324/207.2 |
| 2001/0046087 A1 | 11/2001 | Hoose | |

FOREIGN PATENT DOCUMENTS

| | | |
|---|---|---|
| EP | 1001287 A2 | 5/2000 |
| WO | 9941858 | 8/1999 |

OTHER PUBLICATIONS

Cappiello et al., U.S. Appl. No. 09/545,826, Apr. 10, 2000.
Cappiello et al., U.S. Appl. No. 09/724,771, Nov. 28, 2000.
Cappiello et al., U.S. Appl. No. 09/724,770, Nov. 28, 2000.
Cappiello, U.S. Appl. No. 09/724,638, Nov. 28, 2000.
Cappiello, U.S. Appl. No. 09/724,604, Nov. 28, 2000.
Sussman et al., U.S. Appl. No. 09/724,717, Nov. 28, 2000.
Cappiello et al., U.S. Appl. No. 09/724,804, Nov. 28, 2000.
Boyd, et al. "High-Efficiency Metallic Diffraction Gratings for Laser Applications," Applied Optics, vol. 34, No. 10, Apr. 1, 1995, pp. 1697-1706.
Perry et al., "High-Efficiency Multilayer Dielectric Diffraction Gratings," Optics Letters, vol. 20, No. 8, Apr. 15, 1995, pp. 940-942.
Harada et al., "Transfer Function Matrix Measurement of AWG Multi/Demulti-Plexers," IEICE Trans. Comm., vol. E82-B, No. 2, Feb. 1999, pp. 401-405.
Iida et al., "Narrow-Band Ten-Channel Optical Multiplexer and Demultiplexer Using a Fourier Diffraction Grating," Applied Optics, vol. 31, No. 20, Jul. 20, 1992, pp. 4051-4057.
Chowdhury, Design of Low-Loss and Polarization-Insensitive Reflection Grating-Based Planar Demiltiplexers, IEEE Journal of Selected Topics in Quantum Electronics, vol. 6, No. 2, Mar./Apr. 2000, pp. 233-239.
Graf, "Fabrication and Evaluation of an Etched Infrared Diffraction Grating," Applied Optics, vol. 33, No. 1, Jan. 1, 1994, pp. 96-102.
Simova et al., "A Complete System for Characterization of Spectrally Selective Fiber-Optic Devices," Part of the 18th Congress of the International for Optics: Optics for the Next Millennium, SPIE vol. 3749, Aug. 1999, pp. 124-125.
Garrett et al., "Ultra-Wideband WDM Transmission Using Cascaded Chirped Fiber Gratings," AT&T Labs, Optical Fiber Communication, Optical Society of America, Feb. 1999, pp. PD15-1-PD15-3.
Chua et al., "Component Technology Enables High-Capacity DWDM Systems," Lightwave Aug. 1998, pp. 64, 66, 68-69.

* cited by examiner

ACTUATOR ELEMENT WITH POSITION DETECTION

BACKGROUND OF THE INVENTION

The present invention relates to an actuator element comprising a housing, a drive arranged in the housing, a movably mounted rod operatively connected to the drive to execute a force transmitting movement, and at least one means for detecting position, and to a modular system for producing an actuator element according to the invention.

Actuator elements for operating actuator devices such as flap valves, rotary slide valves or other valves are known in the prior art. For many applications, it is necessary to detect and monitor at least the end positions of a piston rod, which is connected to the drive of the actuator element. It is known from EP 0 345 459 B1 that an electric switch, which can be operated as a function of the position of the piston rod in relation to the housing, may be provided inside a pressure chamber of a pneumatic actuator element. When the piston rod reaches a predetermined position, the switch is actuated and thus delivers an electric signal. The switch is intentionally located in the pressure chamber of the pneumatic actuator element to thus be protected from soiling and corrosion due to corrosive media. Likewise, those skilled in the art are familiar with actuator elements with which the position detection is performed based on the reduction in the signal of a loop potentiometer.

One disadvantage of these solutions is the susceptibility of this contact-controlled end position detection to wear as well as the resulting susceptibility from the standpoint of a reliable signal output. Likewise there is the risk of corrosion of the contacts or the loop contacts of the potentiometer, especially in contact with chemicals or corrosive material. Another disadvantage of the loop potentiometer is the temperature drift that occurs with large changes in temperature and the consequent unreliability of the signal output.

SUMMARY OF THE INVENTION

Accordingly, it is the object of the invention to provide an improved actuator element with integrated position detection.

Another object of the invention is to provide an actuator element with integrated position detection, which will have a simple design.

A further object of the invention is to provide an actuator element with integrated position detection which avoids abrasion or frictional wear.

Yet another object is to provide an actuator element with integrated position detection which can be adapted for use in a wide spectrum of applications by simply replacing a few parts.

A still further object of the invention is to provide an actuator with integrated position detection which not only detects actuator element end positions, but also is capable of detecting positions along the path between the end positions.

These and other objects are achieved in accordance with the present invention by providing an actuator element comprising a housing, a drive situated in the housing, a rod movably mounted in the housing and operatively connected to the drive for executing a force transmitting movement, and a position detector; the position detector comprising at least one stationary Hall sensor and at least one magnet that is movable relative to the Hall sensor in response to motion of the rod and that produces a magnetic field for generating a magnetic flux in the Hall sensor.

In accordance with a further aspect of the invention, the objects are achieved by providing a modular system for producing actuator elements for driving actuator devices wherein individual parts can be combined freely with one another and actuator elements with or without position detection and with or without conversion of translational force to rotational force are produced by different combinations of parts, the modular system comprising: a housing with a drive; at least two rods with means for selective connection to the drive and that are movably guidable in the housing, the at least two rods comprising a first rod bearing at least one magnet and a second rod without a magnet; at least two rotatable disks with means for selective connection to one of the rods such that translational movement of the rod is converted to rotational movement of the disk, the at least two rotatable disks comprising a first disk bearing at least one magnet and a second disk without a magnet, and at least one Hall sensor for selective arrangement in a stationary mount in the housing for detecting translational movement of the rod which bears a magnet or for detecting rotational movement of the rotatable disk which bears a magnet.

The inventive actuator element has a housing with a drive situated in it and at least one means for position detection, in which a rod, e.g. a piston rod, mounted movably in the housing is appropriately connected to the drive to exert an acting force. The means for position detection in this case comprises at least one Hall sensor in a stationary configuration and at least one magnet movable relative to the Hall sensor. The magnetic field created by the magnet generates a magnetic flux through the Hall sensor as a function of the position of the magnet in relation to the Hall sensor. The drive is preferably constructed as a vacuum housing with a diaphragm, i.e., a pneumatic design, but it may also be based on an electric, mechanical or hydraulic design. The structure of the actuator element in this case may be made entirely of plastic, or of a mix of plastic and metal materials, or it may be made entirely of metal.

The rod which is movably mounted in the housing preferably has a square cross section, but it may also have a circular, oval or polygonal cross section without any restriction. Likewise it may also be straight or curved. It is correspondingly connected to the drive, and the connection may also be of a detachable or non-detachable type. It is also possible to construct the connection via an intermediate gear or switching gear or some other type of force transfer.

In the inventive actuator element, the position detection may be realized as a non-contact detection by a Hall sensor stationarily mounted in or on the housing with at least one corresponding movable magnet. The magnetic field generated by the magnet creates a magnetic flux through the Hall sensor as a function of the position of the magnet in relation to the Hall sensor and therefore creates a modified signal at the output of the Hall sensor. Since the output Hall voltage is proportional to the magnetic induction, Hall sensors are used to measure magnetic fields.

Known Hall sensors have either an analog or a digital signal output and some of them are fully programmable, so that any temperature drift or other interfering quantities can be eliminated through the programming and in terms of their functioning they can be regarded as non-contact potentiometers. Due to their type of mounting, Hall sensors can accommodate translational movement sequences including the endpoints thereof as well as rotational movement sequences including the endpoints and angular position.

This is accomplished by the changing magnetic field and magnetic flux as the magnet approaches or retreats from the sensor.

The advantages of this invention can be seen very clearly in the non-contact detection of the change in position and the increased field of potential use which can even include aggressive media and large temperature fluctuations. Due to the non-contact position detection, mechanical wear is completely avoided so that the reproducibility and longterm durability and the resistance to interference are greatly increased. In addition, the technical complexity of this inventive solution is lower than in the prior art because the position detection takes place within the actuator element independently of the drive and thus can be adapted to a wide variety of possible drives. Examples include pneumatic actuators for rotary valves or switching valves. Likewise, a pneumatic drive for a central lock system in automotive engineering would also be conceivable as well as many other embodiments in which an actuator element is needed for adjustment of an actuating device with the need for position detection.

In one advantageous embodiment of this invention, the piston rod is correspondingly connected to a shaft by at least one rotatable disk and thus converts a translational movement of the piston rod into a rotational movement of the shaft. This is comparable, for example, to the crank drive of a bicycle in which a substantially translational movement of the leg with respect to the pedal is converted into a rotational movement on the chain drive. Due to the fact that the piston rod is movably connected in the housing and correspondingly connected to the drive of the actuator element, it is possible for the piston rod to permit a certain angular offset to thereby follow an approximately circular path of the connecting point between the piston rod and the rotatable disk in the outer area of the rotatable disk. However, it is also conceivable for this conversion to take place by way of a type of translation gear, which converts the translational movement into a rotational movement.

The shaft driven in this way may turn, for example, a switch valve, a switch valve connection or a rotatable disk within a certain angular range. However, other possibilities are also conceivable, where a transmission of force through a rotational movement is necessary. The rotatable disk may be in the form of an essentially circular disk based on volume, but here again, the design possibilities are almost unlimited. Thus the rotatable disk may also have an angular or oval shape and in the extreme case it may even consist of only one articulated shaft. The kinematic conversions required for this are well known to persons skilled in the art and thus do not require any further examples here.

According to one advantageous embodiment of this invention, the Hall sensor of the position detection device is detachably situated in the housing of the actuator element. This includes the fact that means by which the Hall sensor is detachably connected via a detachable connection such as a screw connection, a clip connection or a strict plug connection as well as any other types of connections known in the state of the art are provided in the housing and correspond to the Hall sensor. This has the advantage in particular of making the use of the Hall sensor optional. In addition there is the possibility of attaching the Hall sensor to several mounting points provided in the housing depending on the intended use and the conditions of use at various points in the housing for position detection.

In an alternative embodiment, the Hall sensor is non-detachably situated in the housing of the actuator element. Therefore, the Hall sensor is attached to the housing at the mounting point in the housing provided for that purpose by an adhesive joining method or a welding method or some other means known in the state of the art for non-detachable connection of two elements. Due to this non-detachable connection, possible errors due to a change in position of the Hall sensor, e.g., due to vibration and the consequent corrupted signal output can be minimized or avoided.

According to one specific embodiment of this invention, at least one flux guide plate is situated on the Hall sensor to amplify the magnetic flux of the magnet, which is movably mounted, and this flux guide plate essentially overlaps the poles of the magnet in predetermined positions. With the help of this flux guide plate, the magnetic flux can be amplified by a factor in the hundreds, which results in a higher precision of the position detection and a greater insensitivity to external influences such as contamination due to soiling or oil. This flux guide plate is correspondingly connected to the Hall sensor and covers at least a partial area of the path of the magnet that is movably guided in the housing in the change in position due to the piston rod. The shape of the flux guide plate is preferably that of a U shape, with the two legs of the U overlapping the north and south poles, respectively, of the magnet at at least one point along the magnet's path of movement.

In another embodiment of this invention, at least one magnet is situated on the rod and the Hall sensor detects the transitional change in position of the rod. In this case the at least one magnet is preferably integrated into the piston rod so as to yield the least possible hindrance on the magnetic flux. The magnet here can be integrated into recesses in the piston rod and attached to it by detachable or non-detachable connecting means. The magnet here preferably has a cylindrical shape or a rod shape, but other shapes are also conceivable and technically feasible. The magnet executes a relative movement in relation to the stationary Hall sensor when the drive is actuated and the piston rod moves accordingly, so a different signal for identifying the change in position and/or for detection of the end position is output by the Hall sensor due to the change in magnetic flux as a function of the position of the magnet.

According to yet another embodiment of this invention, at least one magnet is situated on the rotatable disk, and the Hall sensor detects the change in rotational position of the shaft. The Hall sensor here is in a stationary mount in the housing so that it can pick up a change in position of the rotatable disk and the shaft connected to it accordingly due to the resulting change in magnetic flux corresponding to a change in position of the magnet due to rotation of the rotatable disk. It is thus simple to detect angles of rotation starting from a zero position of the driven shaft. The preferred application here is for rotary slide valves, which are connected to the shaft, or switch valves or switch valve walls, but other applications are also possible and conceivable in which the position of the shaft and the angle of rotation of the shaft are of relevance for an analysis.

When using a programmable Hall sensor, there is also the possibility of a two-point calibration with the function test including the component to be switched. This is possible, for example, directly at the end of the production line in manufacturing and thus greatly increases the time and cost efficiencies. The actuator element including the component to be switched can thus be calibrated easily and advantageously, which results in a high relevance of the results. The data output by the Hall sensor may thus be forwarded to the engine controller in the motor vehicle, for example, thereby meeting the requirements of on-board diagnosis (OBD) which is required in modern vehicles to comply with emission regulations and to achieve redundancy. The at least one magnet provided on the rotatable disk can be detachably or non-detachably connected to the rotatable disk. Movement of the magnet relative to the stationary Hall sensor due to the rotational motion of the rotatable disk causes a change in magnetic flux. The shape of the magnet has no effect on the function of position detection.

According to another embodiment of this invention, the Hall sensor for detection of predetermined positions has an output for a digital signal. This makes it possible to easily detect, for example, the end positions of the motion and output a signal indicating they have been reached. In this case the Hall sensor functions like a simple end position detection device and thus replaces the closing contact known in the prior art. Thus almost any end position and position detection can be implemented as a function of the signal strength and possible programming of the Hall sensor.

In accordance with still another embodiment of this invention, it is likewise possible for the Hall sensor to have an output for an analog signal for detection of changes in position. In this case, the signal output changes as a function of the change in the magnetic flux. This change occurs as soon as the at least one movable magnet moves relative to the stationary Hall sensor. Thus, with the help of an analyzer logic unit, either constructed in the Hall sensor or provided externally, any point of movement of the piston rod or the rotary slide valve can be detected and output. This possibility thus also permits conclusions regarding the instantaneous position between the two end positions.

Another possibility of realizing the inventive actuator element is to construct the individual variants in a modular system. Using such a modular system, it is possible to manufacture actuator elements for driving actuator devices, in which the individual parts of the modular system can be combined freely with one another and in which the different combinations yield actuator elements with or without position detection and with or without force transfer or conversion of translational force to rotational force. In such modular systems, the design options vary from a simple actuator element with a piston rod which exerts a translational force to an actuator element with a piston rod appropriately connected to a rotatable disk to convert the acting force from a translational movement to a rotational movement, with position detection in which the position detection detects the entire movement sequence. The modular system includes a housing with a drive, at least two movable piston rods that can be optionally used and are guided in the housing, at least two rotary slide valves for corresponding optional connection to the piston rods, and at least one Hall sensor.

The at least two piston rods include at least one piston rod which does not have any magnet and at least one piston rod which is equipped with at least one magnet. The piston rods may be identical with regard to their actual design shape and they may differ only in the subsequent introduction of at least one magnet. Thus it is also possible for the modular system to have at least two identical piston rods and in addition at least one magnet to be included for subsequent mounting on one of the piston rods.

The at least two rotatable disks differ from one another, as is the case with the piston rods, in the arrangement of at least one magnet on one of the rotatable disks. Here again the two rotatable disks may be identical in configuration and the at least one magnet may be situated subsequently on one of the two rotatable disks. Thus, it is possible for the user to appropriately connect the rotatable disks to the piston rods with or without a magnet depending on the choice in order to thereby realize the conversion of translational force to rotational force with position detection. In addition, it is possible for the rotatable disks to be connected to a shaft, e.g., for a rotary slide valve or a switching valve assembly.

Through the use of different fastening points preselected in the housing, it is possible optionally to mount the at least one Hall sensor stationarily in the area of the path of movement of the piston rod or in the area of the path of movement of the rotatable disk. Use of the Hall sensor here is adaptive and preferably occurs, of course, in combination with either the piston rod equipped with the at least one magnet or with the rotatable disk equipped with at least one magnet.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
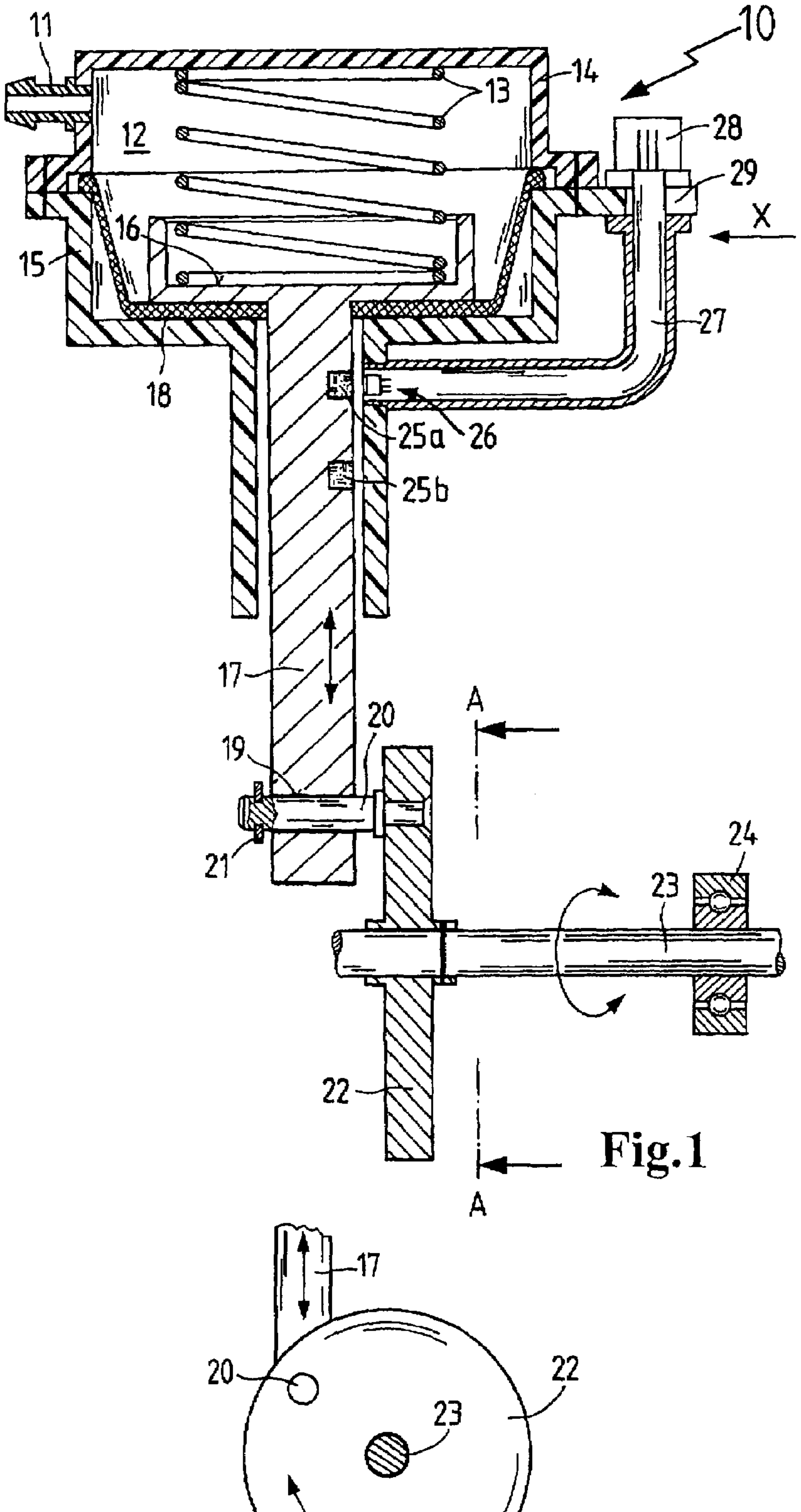
FIG. 1 is a schematic view of an actuator element with position detection and force transfer.

FIG. 1 shows a schematic view of an actuator element 10, constructed in this case as a vacuum actuator element, with a vacuum connection 11 which is connected to a vacuum chamber 12 with a spring 13 disposed therein. The vacuum chamber is formed by a housing top part 14, which is connected to a housing bottom part 15 with a seal. The spring 13 is supported at one end against the housing top part 14 and on the other side against a spring support 16 which is connected to a piston rod 17.

The piston rod 17 is movably guided out of the housing bottom part 15 in the lower area thereof, and the vacuum chamber 12 is separated from the environment by a diaphragm 18 with a seal. The diaphragm 18 and the spring support 16 are joined together so that when a vacuum is applied, the piston rod 17 is pulled toward the housing top part 14 against the force of the spring 13.

At its lower end, the piston rod 17 has a transverse bore 19 through which a pin 20 passes. Pin 20 is rotatably mounted eccentrically in a rotatable disk 22. To secure the pin 20 in the through-bore 19, a locking ring 21 is installed on the end of the pin 20. The rotatable disk 22 is fixedly joined concentrically to a shaft 23, and the shaft is mounted by a ball bearing 24. Due to the tight connection between the rotatable disk 22 and the shaft 23, a rotational force can be transmitted from the rotatable disk to the shaft. Along the remaining course of the shaft 23 a rotary slide valve or a switching valve assembly which is rotatably actuated, for example, can be connected. Since the piston rod 17 is movably mounted in the housing bottom part 15, in the lower area it can follow the circular path of the pin 20 attached to the rotatable disk 22, so that the rotatable disk 22 and the shaft 23 connected to it can be made to execute a rotational movement as a result of an upwardly directed translational movement of the rod 17.

In the upper area of the piston rod 17, two magnets 25*a* and 25*b* are situated. They are embedded in the piston rod 17 and are fixedly connected to it. A Hall sensor 26 is arranged at a fixed location in the housing at the level assumed by the magnet 25*a* when the piston rod 17 is in its lowermost position. The Hall sensor is connected by a closed conduit for a conductor cable 27 to an output plug 28. The system comprised of the Hall sensor 26, the conduit 27 for a conductor cable and the output plug 28 is inserted in direction X into and clipped in a clip opening 29 provided in an upper area of the bottom part 15 of the housing. With this design of the actuator element 10, it is possible either to detect the two end positions of the piston rod 17 via Hall sensor 26 with a digital output or to record the entire path of the piston rod 17 via a Hall sensor 26 with an analog output signal.

The lower end position of the piston rod 17 is characterized in that the magnet 25*a* here is at the level of the stationary Hall sensor 26. The upper end position of the piston rod 17 is reached as soon as the magnet 25*b* is at the level of the Hall sensor 26. Since the Hall sensor 26 responds to a change in the magnetic field strength and/or the magnetic flux, it emits an end position signal on reaching the highest magnetic field strength. The highest magnetic field strength is reached as soon as the magnet is exactly at the height of the Hall sensor.

The simple design of the inventive actuator element is clearly discernible here. Due to the arrangement of the Hall sensor 26 and the magnets 25*a* and 25*b* outside of the pressure chamber 12, a pneumatic drive having a very small structural height can be achieved. The noncontact sensing has proven to be especially advantageous in this situation because this area is necessarily not entirely free of contamination and/or corrosive media.

If a Hall sensor with an analog output is used in this arrangement, then the precise path of the piston rod 17 can be followed based on the reduction in, the magnetic field strength between the two magnets 25*a* and 25*b*. These values can then be analyzed, for example, by an engine control unit and then incorporated into the calculation, for example, of an engine characteristic curve.

Figure 2:
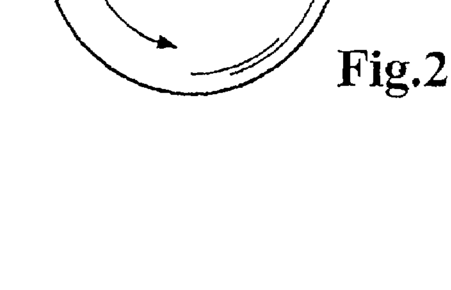
FIG. 2 shows a sectional view of the force transfer according to A—A in FIG. 1.

FIG. 2 shows section A—A as a lateral plan view of the rotatable disk 22. Parts corresponding to FIG. 1 are identified by the same reference numbers. In this view it can be seen that the rotatable disk 22 is situated concentrically on the shaft 23 and is connected to it in a rotationally fixed manner. The connecting pin 20 between the piston rod 17 and the rotatable disk 22 is eccentrically positioned and thus causes the rotatable disk 22 and the shaft 23 which is connected to it, to rotate when the piston rod 17 executes a translational movement.

Figure 3:
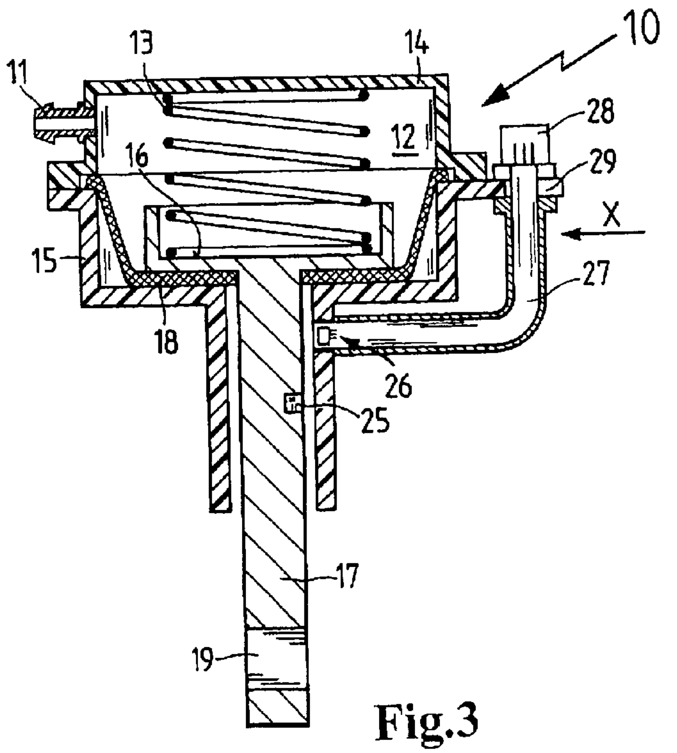
FIG. 3 shows a schematic view of an actuator element with position detection without force transfer.

FIG. 3 shows a schematic view of a variant of the inventive actuator element 10. Once again, parts corresponding to in FIG. 1 are identified by the same reference numbers. This pneumatic actuator element 10 differs from the actuator element 10 in FIG. 1 in that in this case there is no conversion of the translational movement of the piston rod 17 into a rotational movement of a shaft 23. Another important difference is that in this case only one magnet 25 is provided on the piston rod 17. When the Hall sensor has a digital design, only the end position of the piston rod 17 is detected via the Hall sensor when the actuator element 10 is acted upon by a vacuum. As soon as the magnet 25 is brought into overlapping position with the Hall sensor 26 due to displacement of the piston rod 17 toward the housing top part 14, the Hall sensor outputs a signal that the actuator has reached the end position. The actuator element 10 in FIG. 3 is shown in the second end position of the piston rod 17, which is limited mechanically by the walls of the housing bottom part 15. This is a simple variant of the inventive actuator element. Alternatively, by using a Hall sensor 26 which has an analog output in this arrangement, the position of rod 17 can be detected along its entire course. In this case, the strength of the magnetic field increases continuously up to the end stop in the form in which it is acted upon by a vacuum. If the Hall sensor 26 is suitably programmed and calibrated, even this simple form can achieve a controlled recording of the path of the rod. If it is not possible to mount an enclosed conduit 27 for a cable on the housing due to space reasons, then it is likewise possible with all variants to work with an exposed cable and to arrange the output plug 28 on another component near the actuator element.

Figure 4:
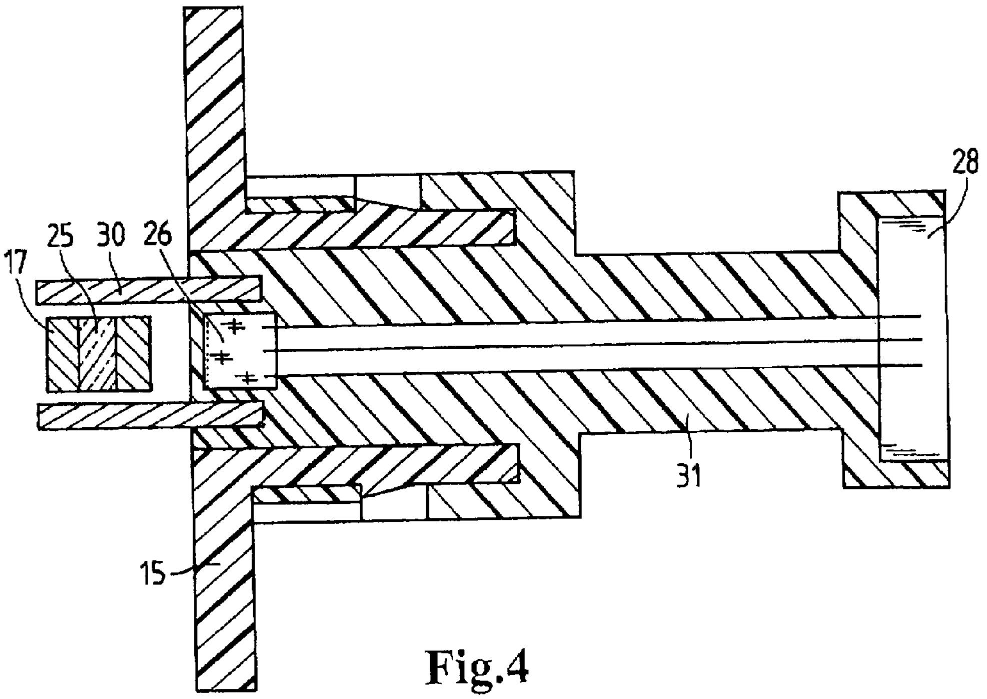
FIG. 4 shows a schematic view of an enlargement of the position detection device.

FIG. 4 shows a schematic view of an enlargement of the Hall sensor with flux guide plates mounted on it. Parts that correspond to those in FIG. 1 are identified by the same reference numbers. In FIG. 4 the piston rod 17 moves into the plane of the paper and the system for position detection is shown in a sectional view taken through the Hall sensor 26. It can be seen here that a sensor housing 31 having an output plug 28 has been clipped into a corresponding receptacle on the housing bottom part 15. The Hall sensor 26 and two flux guide plates 30 are embedded in the sensor housing 31. It can be seen here that in this position, the flux guide plates 30 completely overlap the magnet 25 integrated in the piston rod 17. The magnetic flux emitted by the magnet 25 is amplified by the flux guide plates 30 by a factor in the hundreds, thus increasing the sensitivity of the Hall sensors 26 to a change in the magnetic flux to the same extent. Upon movement of the piston rod 17 into or out of the plane of the paper, the resulting change in the magnetic field strength produces a different magnetic induction in the Hall sensor 26 and thus an altered output signal at the output plug 28. The presence of the flux guide plates 30 is optional, however, and is not absolutely necessary for detecting an altered magnetic field strength due to a movement of the piston rod 17. The flux guide plates 30 are used to increase the magnetic field and thus entail the possibility of using a less sensitive Hall sensor 26 with the cost advantages associated with that.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An actuator element comprising:

a housing, a drive situated in the housing, a rod movably mounted in the housing and operatively connected to the drive for executing a force transmitting movement, a position detector; said position detector comprising at least one stationary Hall sensor and at least one magnet that is movable relative to the Hall sensor in response to motion of the rod and that produces a magnetic field for generating a magnetic flux in the Hall sensor, and at least one flux guide plate arranged adjacent the Hall sensor to amplify the magnetic flux sensed by the sensor, wherein said at least one flux guide plate overlaps the poles of the magnet when the magnet is in a predetermined position.

2. An actuator element according to claim 1, wherein said rod is connected via a rotatable disk to a rotatable shaft such that a translational movement of the rod is converted into a rotational movement of the shaft.

3. An actuator element according to claim 1, wherein the Hall sensor is detachably mounted in the housing of the actuator element.

4. An actuator element according to claim 1, wherein the Hall sensor is non-detachably fixed in the housing of the actuator element.

5. An actuator element according to claim 1, wherein said at least one magnet is disposed on said rod, and the Hall sensor detects a translational change in position of the rod.

6. An actuator element according to claim 1, wherein the Hall sensor outputs a digital signal for indicating the actuator has attained a predetermined position.

7. An actuator element according to claim 1, wherein the Hall sensor outputs an analog signal for indicating a change in position of the actuator.

8. An actuator element comprising:

a housing, a drive situated in the housing, a rod movably mounted in the housing and operatively connected to the drive for executing a force transmitting movement, and a position detector: said position detector comprising at least one stationary Hall sensor and at least one magnet that is movable relative to the Hall sensor in response to motion of the rod and that produces a magnetic field for generating a magnetic flux in the Hall sensor, wherein said rod is connected via a rotatable disk to a rotatable shaft such that a translational movement of the rod is converted into a rotational movement of the shaft, and wherein said at least one magnet is arranged on said rotatable disk, and the Hall sensor detects a rotational change in position of the disk and shaft.

* * * * *